United States Patent [19]

Olszewski

[11] 3,873,456

[45] Mar. 25, 1975

[54] PHOSPHORUS-CONTAINING COMPOUNDS AND LUBRICANTS CONTAINING SAME

[76] Inventor: William F. Olszewski, 42 Knollwood Dr., Cherry Hill, N.J. 08034

[22] Filed: Mar. 22, 1973

[21] Appl. No.: 344,006

[52] U.S. Cl................................. 252/46.7, 260/937
[51] Int. Cl................................................ C10m 1/48
[58] Field of Search.................................... 252/46.7

[56] References Cited
UNITED STATES PATENTS

| | | | |
|---|---|---|---|
| 2,970,110 | 1/1961 | Fields | 252/46.7 X |
| 3,193,501 | 7/1965 | Matson | 252/46.7 |
| 3,567,638 | 3/1971 | Braid | 252/46.7 |

OTHER PUBLICATIONS

Chemical Abstracts, Vol. 71, 81448t (1969).

*Primary Examiner*—H. Sneed
*Attorney, Agent, or Firm*—Charles A. Hugget; Raymond W. Barclay; Claude E. Setliff

[57] ABSTRACT

Phosphorus-containing compounds are provided that impart excellent extreme pressure properties to lubricants.

7 Claims, No Drawings

PHOSPHORUS-CONTAINING COMPOUNDS AND LUBRICANTS CONTAINING SAME

BACKGROUND OF THE INVENTION

1. Field of the Invention

The invention relates to a new class of phosphorus-containing compounds and to their use as lubricant additives. More particularly, it relates to compounds made by reacting certain cyclic dialkanol compounds with phosphorus pentasulfide followed by reaction of this product with an unsaturated carboxylate ester, and their use as lubricant additives.

2. Discussion of the Prior Art

It is known that sliding or rubbing metal or other solid surfaces are subject to wear under conditions of extreme pressure. Wearing is particularly acute in modern engines in which high temperatures and contact pressures are prevalent. under such conditions, severe erosion of metal surfaces can take place even with lubricants of ever-increasing sophistication, unless a load carrying additive is present. As a consequence, much effort has been expended to discover additives useful in preventing such wear.

With certain metals, and under certain conditions, especially high temperature conditions, many of the conventional additives, although they may impart extreme pressure properties, may cause or permit corrosion of the metal. The compounds of this invention are not corrosive to metals such as copper.

SUMMARY OF THE INVENTION

The invention provides compounds of the formula

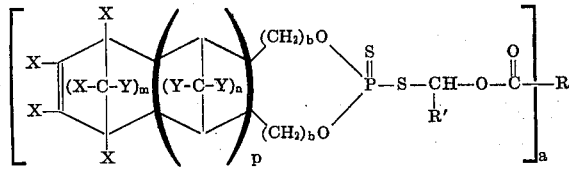

wherein R is hydrogen, hydrocarbyl or hydrocarbylene of from 1 to 22 carbon atoms, R' is hydrocarbyl of from 1 to 22 carbon atoms or the halo (e.g., chlorine, bromine, fluorine and iodine) substituted members thereof, X is halogen, Y is hydrogen, halogen or alkyl of from 1 to 10 carbon atoms, $m$ is 1–4, $n$ is 0–4, $p$ is 0–4, $a$ is 1 or 2 and $b$ is 1 to 3.

As used herein, "hydrocarbyl" and "hydrocarbylene" with respect to R in the above formula shall mean those members containing from 1 to 22 carbon atoms and may be from the group, consisting of alkyl, alkylthio, cycloalkyl, alkenyl, aryl, aralkyl, alkaryl, alkenylaryl, alkylene, arylene and alkenylene. With respect to R', "hydrocarbyl" will have the same number of carbons as designated for the member under R and will be selected from alkyl, aralkyl, aryl and the halo-substituted members thereof.

DESCRIPTION OF SPECIFIC EMBODIMENTS

The compounds of this invention may be made by general processes that are well known in the art. In the practice of this invention, they were made in a two step process involving, first, the reaction between a dimethanol polyhalopolycyclic compound and phosphorus pentasulfide and, second, between the product produced and the appropriate unsaturated carboxylate ester. The reactions for the product where $a$ is 1., are, in generalized form, shown as follows:

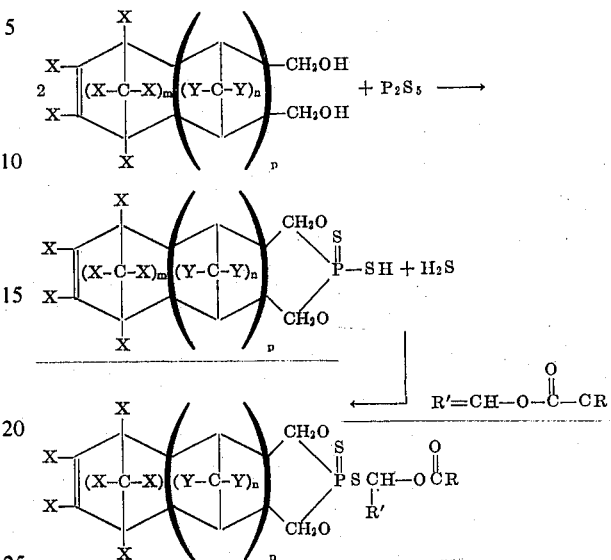

R, R', X, Y, $m$, $n$ and $p$ are as already defined. Further details on the reaction may be found in U.S. Pat. No. 2,974,147, U.S. Pat. No. 3,007,958 and in C.A. 71, 81448t (1969).

In carrying out the reaction to form the phosphorodithioic acid, stoicheometric quantities of the dimethanol and phosphorus pentasulfide may be used, but in general I prefer a slight excess of phosphorus pentasulfide, not exceeding about 10–15 percent by weight. Of course, this will be a matter of choice, governed by the economics of using more than 15 percent excess. More than this, however, will generally give no benefit to the overall reaction. While atmospheric pressure is preferred, the reaction can advantageously be run at from 1–10 atmospheres.

Where conditions employed warrant it, a solvent may be used if desired or necessary. In general, any nonpolar, unreactive solvent can be used. Illustrative of those that can be used are xylene and 1,4-dioxane. Whether employing such solvent or not, the initial reaction will usually be complete in from 2–8 hours, and will preferably be complete in 3–4 hours.

This product is then reacted with a carboxylate ester for from 1–8 hours, preferably 2–3 hours in a non-polar solvent, preferably benzene at 25°–100°C, preferably 60°–65°C.

The additives of this invention can be used in a wide variety of lubricant media. Thus, they are effective agents for lubricating oils such as mineral oils, both naphthenic and paraffinic, including those containing substantial amounts of aromatic oils. They are also effective for synthetic oils, such as synthetic hydrocarbons, which are obtained by polymerizing olefins, synthetic esters and for polysiloxanes and the like. The term "lubricant" also includes greases made from any of the mentioned lubricating oils by adding a grease forming agent thereto. One particular ester oil of importance is one made by reacting an aliphatic monocarboxylic acid containing from 4 to 10 carbon atoms, preferably 5 to 9, with pentaerythritol. A widely used lubricating oil is made from monopentaerythritol and a mixed $C_5$ and $C_9$ acid.

When used for the purposes herein disclosed, the additives are effective at from about 0.02 percent by weight to about 10.0 percent by weight, preferably from about 0.10 percent to about 2.0 percent.

The following examples will serve to illustrate the invention. It should be kept in mind that they are for illustration only and are not intended to limit the inventive scope.

EXAMPLE 1

Part A
Preparation of 3-thiono-3-mercapto-6,7,8,9,10,10-hexachloro-5,5a,6,9,9a-hexahydro-6,9-methano-2,4,3-benzodioxaphosphepin

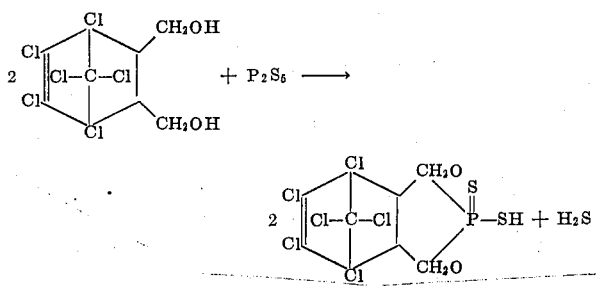

A mixture of 1,4,5,6,7,7-hexachloro-5-norbornene-2,3-dimethanol (289 g. 0.8 mole), excess phosphorus pentasulfide (111 g., 0.5 mole), 1,4-dioxane (308 g., 3.5 mole), and xylene (688 g., 6.5 mole) was refluxed for 3 hours in a nitrogen atmosphere. Solvents were removed by topping to a pot temperature of 120°C at 10 mm pressure. The product was obtained as a purple solid and used immediately as shown in Part B.

Part B
Preparation of 3-(1-acetoxyethyl)thiolo-3-thiono-6,7,8,9,10, 10-hexachloro-5,5a,6,9,9a-hexahydro-6,9-methano-2,4,3-benzodioxaphosphepin.

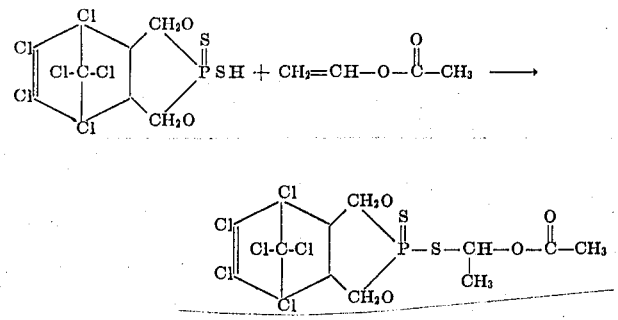

Excess vinyl acetate (34 g., 0.40 mole) was added over one hour to a solution of 3-thiono-3-mercapto-6,7,8,9, 10,10-hexachloro-5,5a,6,9,9a-hexahydro-6,9-methano-2,4,3,-benzodioxaphosphepin (116 g., 0.26 mole) in benzene (750 ml.) while maintaining the pot temperature at 60°–65°C by the external application of heat. After completion of the addition the reaction mixture was refluxed for 2.5 hours. The product was obtained in quantitative yield after removal of the solvent.

| Product Analysis: | % Chlorine | — 37.4 |
|---|---|---|
| | % Sulfur | — 12.7 |
| | % Phosphorus | — 7.0 |

The following will provide additional examples of the compounds contemplated by this invention.

| R | R' | X | Y | b | a | p |
|---|---|---|---|---|---|---|
| Butylene | pentyl | Cl | Cl | 2 | 2 | 1 |
| dodecyl | propyl | Cl | — | 1 | 1 | 0 |
| cicosyl | decyl | Cl | Cl | 2 | 2 | 1 |

R and R' can also be methyl, butyl, octyl, octadecyl, nonadecyl, cyclohexyl, oleyl, benzyl ethylphenyl, butylphenyl, octylphenyl, nonylphenyl oleylphenyl, ethylene, and the like.

EVALUATION OF THE COMPOUNDS

Table 1 below shows the improved wear properties of a mineral oil containing additive amounts of the compounds of the above Examples as measured in the SAE machine modified to provide the following conditions: 400 lb load, 275°F oil temperature, 45 minute test period, upper shaft speed of 156 rpm keeping the ratio of the two shafts at the usual 14.6 to 1. The results are expressed in terms of weight loss of the specimen. The same table illustrates the stability of the compounds of this invention in the Copper Corrosion Test, ASTM Method D130-6 (250°F, 3 hours).

Table 2 below demonstrates the improved load carrying properties in the Shell Four-Ball Test of a synthetic oil containing additive amounts of the inventive products.

Table 1

| Additive | Conc. % P | 1000 SAE Load Carrying Test (Seizure Load) | 156 SAE Wear Test Wear (mg) | Copper Corrosion 250°F, 3 hours |
|---|---|---|---|---|
| Base Oil | None | 50 | Fail at 160 lbs. | — |
| Ex. 1 Part B | 0.15 | 420 | 67 | 2A |

Base Oil used was an SAE 90, solvent refined Mid-Continent oil.

Table 2

| Additive | Conc. % P | Scar Diameter (mm), 60 Kg, 30 Minutes 80°F | | | | 390°F | | |
|---|---|---|---|---|---|---|---|---|
| | | 500 RPM | 1000 RPM | 1500 RPM | 2000 RPM | 500 RPM | 1000 RPM | 1500 RPM |
| Base Oil | None | 0.72 | 0.93 | 1.13 | 2.00 | 0.91 | 2.24 | >2.24 |
| Ex. 1 Part B | 0.04 | 0.60 | 0.60 | 0.60 | 0.83 | 0.50 | 0.56 | 0.75 |

Base oil used was a pentaerythritol ester of mixed $C_5$-$C_9$ acids.

I claim:

1. A lubricant composition comprising a major proportion of a lubricant and an amount sufficient to give improved extreme pressure properties of a compound of the formula

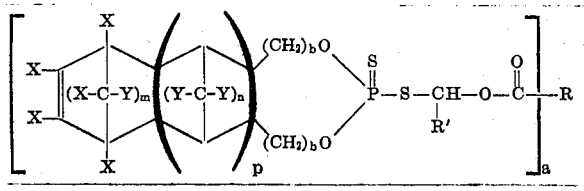

wherein R is hydrogen, hydrocarbyl of from 1 to 22 carbon atoms or hydrocarbylene of from 1 to 22 carbon atoms, R' is hydrocarbyl of from 1 to 22 carbon atoms or the halo-substituted members thereof, X is halogen, y is hydrogen, halogen or alkyl of from 1 to 10 carbon atoms, m is 1–4, n is 0–4, p is 0–4, a is 1 or 2 and b is 1 to 3.

2. The composition of claim 1 wherein the compound is present at a concentration of from about 0.02 to about 10.0 percent by weight.

3. The composition of claim 1 wherein the lubricant is a lubricating oil.

4. The composition of claim 1 wherein the lubricant comprises a grease.

5. The composition of claim 3 wherein the lubricating oil is a mineral lubricating oil.

6. The composition of claim 3 the lubricating oil is a synthetic ester lubricating oil.

7. The composition of claim 2 wherein the compound has the formula

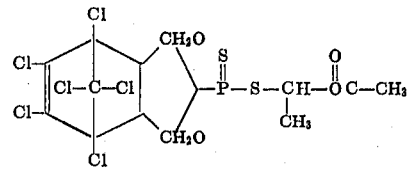

* * * * *

UNITED STATES PATENT AND TRADEMARK OFFICE
CERTIFICATE OF CORRECTION

PATENT NO. : 3,873,456
DATED : March 25, 1975
INVENTOR(S) : WILLIAM F. OLSZEWSKI It is certified that error appears in the above-identified patent and that said Letters Patent are hereby corrected as shown below:

On the Title Page in Column 1, the heading should show the fact the Assignment is to Mobil Oil Corporation.

| | |
|---|---|
| Column 2, line 28 | "71" should be --$\underline{71}$-- |
| Column 1, formula and Column 5, Claim 1, formula | In the left-hand ring structure, "$(X-C-Y)_m$" should be --$(X-C-X)_m$--. |

Signed and Sealed this seventh Day of October 1975

[SEAL]

Attest:

RUTH C. MASON
Attesting Officer

C. MARSHALL DANN
Commissioner of Patents and Trademarks